(12) United States Patent
Wang et al.

(10) Patent No.: US 12,301,002 B2
(45) Date of Patent: May 13, 2025

(54) POWER DISPATCH CONTROL SYSTEM FOR MULTIPLE POWER GENERATION SOURCES

(71) Applicant: General Electric Company, Schenectady, NY (US)

(72) Inventors: Honggang Wang, Clifton Park, NY (US); Sumit Bose, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 120 days.

(21) Appl. No.: 17/896,252

(22) Filed: Aug. 26, 2022

(65) Prior Publication Data

US 2024/0072538 A1 Feb. 29, 2024

(51) Int. Cl.
*H02J 3/00* (2006.01)
*B64D 27/24* (2024.01)

(52) U.S. Cl.
CPC .............. *H02J 3/003* (2020.01); *B64D 27/24* (2013.01); *H02J 3/007* (2020.01)

(58) Field of Classification Search
CPC ............ H02J 3/003; H02J 3/007; B64D 27/24
USPC ......................................................... 307/9.1
See application file for complete search history.

(56) References Cited

U.S. PATENT DOCUMENTS

| | | | |
|---|---|---|---|
| 3,658,279 A | 4/1972 | Robertson | |
| 3,805,517 A | 4/1974 | Sewell et al. | |
| 4,684,081 A | 8/1987 | Cronin | |
| 5,227,256 A | 7/1993 | Marianowski et al. | |
| 5,581,995 A | 12/1996 | Lucenko et al. | |
| 5,858,314 A | 1/1999 | Hsu et al. | |
| 5,968,680 A | 10/1999 | Wolfe et al. | |
| 6,183,703 B1 | 2/2001 | Hsu et al. | |

(Continued)

FOREIGN PATENT DOCUMENTS

| CA | 2446360 A1 | 4/2004 |
|---|---|---|
| CN | 100367556 C | 2/2008 |

(Continued)

OTHER PUBLICATIONS

Babu D et al., Optimization of Pattern Factor of the Annular Gas Turbine Combustor for Better Turbine Life, IOSR Journal of Mechanical and Civil Engineering, pp. 30-35.

(Continued)

*Primary Examiner* — Michael R. Fin
(74) *Attorney, Agent, or Firm* — Dority & Manning, P.A.

(57) ABSTRACT

A power generation system for an aircraft includes a first power source, a second power source, and a power dispatch module communicatively coupled with the first and second power sources. The power dispatch module includes a controller having one or more processors configured to perform a plurality of operations, including but not limited to receiving a plurality of loading data associated with the power generation system, predicting a future power demand due to future load changes using the loading data, determining first and second power setpoints for the first and second power sources, respectively, based on the future power demand due to the future load changes, and controlling first and second power outputs of the first and second power sources based on the first and second power setpoints such that the future power demand of the power generation system is shared by the first and second power sources.

20 Claims, 7 Drawing Sheets

(56) References Cited

U.S. PATENT DOCUMENTS

| | | |
|---|---|---|
| 6,296,957 B1 | 10/2001 | Graage |
| 6,348,278 B1 | 2/2002 | LaPierre et al. |
| 6,630,264 B2 | 10/2003 | Haltiner, Jr. et al. |
| 6,641,084 B1 | 11/2003 | Huber et al. |
| 6,834,831 B2 | 12/2004 | Daggett |
| 7,239,035 B2 | 7/2007 | Garces et al. |
| 7,279,243 B2 | 10/2007 | Haltiner, Jr. et al. |
| 7,285,350 B2 | 10/2007 | Keefer et al. |
| 7,380,749 B2 | 6/2008 | Fucke et al. |
| 7,456,517 B2 | 11/2008 | Campbell et al. |
| 7,470,477 B2 | 12/2008 | Zizelman et al. |
| 7,513,119 B2 | 4/2009 | Zielinski et al. |
| 7,578,136 B2 | 8/2009 | Derouineau et al. |
| 7,659,021 B2 | 2/2010 | Horiuchi et al. |
| 7,709,118 B2 | 5/2010 | Lundberg |
| 7,743,499 B2 | 6/2010 | Pettit et al. |
| 7,781,115 B2 | 8/2010 | Lundberg |
| 7,854,582 B2 | 12/2010 | Ullyott |
| 7,926,287 B2 | 4/2011 | Ullyott et al. |
| 7,966,801 B2 | 6/2011 | Umeh et al. |
| 7,966,830 B2 | 6/2011 | Daggett |
| 8,137,854 B2 | 3/2012 | Gans |
| 8,141,360 B1 | 3/2012 | Huber |
| 8,232,670 B2 | 7/2012 | Breit et al. |
| 8,268,510 B2 | 9/2012 | Rock et al. |
| 8,288,060 B2 | 10/2012 | Bae et al. |
| 8,309,270 B2 | 11/2012 | Finnerty et al. |
| 8,373,381 B2 | 2/2013 | Raiser et al. |
| 8,394,552 B2 | 3/2013 | Gummalla et al. |
| 8,524,412 B2 | 9/2013 | Rock et al. |
| 8,722,270 B2 | 5/2014 | Pastula et al. |
| 8,727,270 B2 | 5/2014 | Burns et al. |
| 8,732,532 B2 | 5/2014 | Higeta |
| 8,820,677 B2 | 9/2014 | Rajashekara et al. |
| 8,846,255 B2 | 9/2014 | Dineen |
| 8,875,519 B2 | 11/2014 | Dooley |
| 8,950,703 B2 | 2/2015 | Bayliss et al. |
| 9,005,847 B2 | 4/2015 | Rock et al. |
| 9,028,990 B2 | 5/2015 | Gans et al. |
| 9,054,385 B2 | 6/2015 | Jones et al. |
| 9,059,440 B2 | 6/2015 | Hotto |
| 9,068,748 B2 | 6/2015 | Hoke |
| 9,118,054 B2 | 8/2015 | Gummalla et al. |
| 9,347,379 B2 | 5/2016 | Dooley |
| 9,359,956 B2 | 6/2016 | Dooley |
| 9,435,230 B2 | 9/2016 | Kim et al. |
| 9,444,108 B2 | 9/2016 | Brousseau |
| 9,464,573 B2 | 10/2016 | Remy et al. |
| 9,472,940 B2 | 10/2016 | Nakamura et al. |
| 9,541,001 B2 | 1/2017 | Steinwandel et al. |
| 9,604,730 B2 | 3/2017 | Hagh et al. |
| 9,617,006 B2 | 4/2017 | Brugger et al. |
| 9,666,888 B2 | 5/2017 | Nagai et al. |
| 9,777,638 B2 | 10/2017 | Freidl |
| 9,897,041 B2 | 2/2018 | Hoffjann et al. |
| 9,966,619 B2 * | 5/2018 | Libis ............... H01M 8/04992 |
| 10,008,726 B2 | 6/2018 | Leah et al. |
| 10,035,607 B2 | 7/2018 | Wangemann et al. |
| 10,069,150 B2 | 9/2018 | Mata et al. |
| 10,224,556 B2 | 3/2019 | Lents et al. |
| 10,318,003 B2 | 6/2019 | Gannon et al. |
| 10,443,504 B2 | 10/2019 | Dalal |
| 10,446,858 B2 | 10/2019 | Palumbo et al. |
| 10,487,839 B2 | 11/2019 | Kupiszewski et al. |
| 10,622,653 B2 | 4/2020 | Whyatt et al. |
| 10,641,179 B2 | 5/2020 | Hayama et al. |
| 10,644,331 B2 | 5/2020 | Stoia et al. |
| 10,671,092 B2 | 6/2020 | DiRusso et al. |
| 10,676,208 B2 | 6/2020 | Wangemann et al. |
| 10,724,432 B2 | 7/2020 | Shapiro et al. |
| 10,737,802 B2 | 8/2020 | Krug et al. |
| 10,762,726 B2 | 9/2020 | Gansler et al. |
| 10,766,629 B2 | 9/2020 | Mercier-Calvairac et al. |
| 10,774,741 B2 | 9/2020 | Sennoun |
| 10,814,992 B2 | 10/2020 | Halsey et al. |
| 10,913,543 B2 | 2/2021 | Bailey et al. |
| 10,919,635 B2 | 2/2021 | Edgar et al. |
| 10,950,875 B1 | 3/2021 | Radhakrishnan et al. |
| 10,967,984 B2 | 4/2021 | Willford et al. |
| 10,978,723 B2 | 4/2021 | Lo et al. |
| 11,015,480 B2 | 5/2021 | Waun |
| 11,114,855 B2 | 9/2021 | Handelsman et al. |
| 2002/0163819 A1 | 11/2002 | Treece |
| 2004/0081871 A1 | 4/2004 | Kearl et al. |
| 2004/0150366 A1 | 8/2004 | Ferrall et al. |
| 2006/0010866 A1 | 1/2006 | Rehg et al. |
| 2008/0155984 A1 | 7/2008 | Liu et al. |
| 2010/0133475 A1 | 6/2010 | Kobayashi et al. |
| 2010/0138070 A1 | 6/2010 | Beaudoin |
| 2010/0159303 A1 | 6/2010 | Rock et al. |
| 2011/0071707 A1 | 3/2011 | Crumm et al. |
| 2012/0161512 A1 | 6/2012 | Metzler et al. |
| 2012/0301814 A1 | 11/2012 | Beasley et al. |
| 2013/0099560 A1 | 4/2013 | Shipley et al. |
| 2013/0280634 A1 | 10/2013 | Park et al. |
| 2014/0023945 A1 | 1/2014 | Epstein et al. |
| 2014/0325991 A1 | 11/2014 | Liew et al. |
| 2015/0030947 A1 | 1/2015 | Saunders et al. |
| 2015/0151844 A1 | 6/2015 | Anton et al. |
| 2016/0260991 A1 | 9/2016 | Shapiro et al. |
| 2017/0070088 A1 | 3/2017 | Bernsten et al. |
| 2018/0003072 A1 | 1/2018 | Lents et al. |
| 2018/0141675 A1 | 5/2018 | Halsey et al. |
| 2018/0166734 A1 | 6/2018 | Linde et al. |
| 2018/0233923 A1 | 8/2018 | Compton et al. |
| 2018/0291807 A1 | 10/2018 | Dalal |
| 2018/0319283 A1 | 11/2018 | Battin et al. |
| 2019/0058434 A1 | 4/2019 | Yu |
| 2019/0121369 A1 | 4/2019 | DiRusso et al. |
| 2019/0136761 A1 | 5/2019 | Shapiro et al. |
| 2019/0145273 A1 | 5/2019 | Frank et al. |
| 2020/0014044 A1 | 1/2020 | Tichy et al. |
| 2020/0062414 A1 | 2/2020 | Hon et al. |
| 2020/0063599 A1 | 2/2020 | Waun |
| 2020/0136163 A1 | 4/2020 | Holland et al. |
| 2020/0149479 A1 | 5/2020 | Des Roches-Dionne et al. |
| 2020/0194799 A1 | 6/2020 | Hart et al. |
| 2020/0313207 A1 | 10/2020 | Milcarek et al. |
| 2021/0003281 A1 | 1/2021 | Amble et al. |
| 2021/0075034 A1 | 3/2021 | Irie et al. |
| 2021/0115857 A1 | 4/2021 | Collopy |
| 2022/0021223 A1 * | 1/2022 | Wang ..................... H02J 1/02 |
| 2022/0261022 A1 * | 8/2022 | Dasgupta ............... B64D 31/00 |

FOREIGN PATENT DOCUMENTS

| | | |
|---|---|---|
| CN | 106976405 A | 7/2017 |
| DE | 102005012230 A1 | 10/2005 |
| DE | 10200950812 B4 | 4/2017 |
| EP | 2709230 A2 | 3/2014 |
| EP | 2800186 B1 | 2/2018 |
| EP | 3336948 B1 | 9/2019 |
| EP | 3805107 A1 | 4/2021 |
| JP | 2009187756 A | 8/2009 |
| JP | 2011002308 A | 1/2011 |
| JP | 2018087501 A | 6/2018 |
| KR | 20090064853 A | 6/2009 |
| WO | WO9965097 A1 | 12/1999 |
| WO | WO2018108962 A1 | 6/2018 |
| WO | WO2019160036 A1 | 8/2019 |
| WO | WO2020/011380 A1 | 1/2020 |

OTHER PUBLICATIONS

Cocker et al., 3D Printing Cuts Fuel Cell Component Costs, Energy and Environmental Science Article featured in Chemistry World, Jul. 3, 2014, 3 Pages. https://www.chemistryworld.com/news/3d-printing-cuts-fuel-cell-component-costs/7526.article.

Code of Federal Regulations, National Archives, Title 14, Chapter I, Subchapter C, Part 33, §33.75 Safety Analysis, 2007, refer to p. 25 of 50. https://www.ecfr.gov/cgi-bin/text-idx?SID=5e1a000b517423bb51a8f713ca211b68&mc=true&node=pt14.1.33&rgn=div5#se14.1.33 175.

(56) References Cited

OTHER PUBLICATIONS

Feiner, Power-by-Wire Aircraft Secondary Power Systems, AIAA/IEEE Digital Avionics Systems Conference, 1993, pp. 439-444. (Abstract Only).

Honegger, Gas Turbine Combustion Modeling for a Parametric Emissions Monitoring System, Thesis Kansas State University College of Engineering, Manhattan Kansas, 2004, 97 Pages. https://core.ac.nk/download/pdf/5164453.pdf.

Krishnan, Recent Developments in Metal-Supported Solid Oxide Fuel Cells, Wires Energy and Environment, vol. 6, Issue 5, Mar. 30, 2017, 34 Pages. (Abstract Only) https://doi.org/10.1002/wene 246.

Mark et al., Design and Analysis of Annular Combustion Chamber of a Low Bypass Turbofan Engine in a Jet Trainer Aircraft, Propulsion and Power Research, vol. 5, Issue 2, 2015, pp. 97-107.

Thorud, Dynamic Modelling and Characterisation of a Solid Oxide Fuel Cell Integrated in a Gas Turbine Cycle, Trondheim, NTNU, Oct. 2005, 278 Pages.

Turbine Engine Relighting in Flight, Certification Memorandum, CM-PIFS-010, European Aviation Safety Agency (EASA), Issue 1, Apr. 29, 2015, 6 Pages.

Whyatt et al., Electrical Generation for More-Electric Aircraft Using Solid Oxide Fuel Cells, No. PNNL-21382, Pacific Northwest National Lab (PNNL), Richland WA, 2012, 110 Pages. https://www.energy.gov/sites/prod/files/2014/03/f9/sofc_for_aircraft_pnnl_2012.pdf.

\* cited by examiner

POWER DISPATCH CONTROL SYSTEM FOR MULTIPLE POWER GENERATION SOURCES

FIELD

The present disclosure relates to electrical power systems for vehicles, such as aircraft.

BACKGROUND

Aircraft and other vehicles can include electrical power systems that include power sources that provide electric power to power consumers. Conventionally, a centralized approach has been taken to allocate the power output from each power source to meet the power demand of the power consumers. For instance, supervisor controllers have been used to determine the load share that each power source is responsible to output in order to meet the power demand of the power consumers. Such conventional systems may have certain drawbacks.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The singular forms "a", "an", and "the" include plural references unless the context clearly dictates otherwise.

The terms "upstream" and "downstream" refer to the relative direction with respect to fluid flow in a fluid pathway. For example, "upstream" refers to the direction from which the fluid flows, and "downstream" refers to the direction to which the fluid flows.

There is an increasing interest and need to increase the electric power fraction in aircraft. The engine-driven generator, which is generally the primary power source for aircraft, can cause high drag load for the engine. With increased electric power fraction, generating power using the generator alone is becoming less efficient and impractical. For example, in some instances, engine-driven generators may only support, at maximum, 12% electric power fraction, while fuel cell assemblies may extend the electric power fraction to 30%. Thus, with more electrical loads on the aircraft, there is a need for power allocation among power sources to ensure reliable, stable, and efficient power supply.

Accordingly, the present disclosure relates to electrical power systems for vehicles, such as aircraft. Such electrical power systems can include power sources that provide electrical power to one or more power consumers. In particular, electrical power systems according to the present disclosure may receive an initial power demand for the power generation system and use droop-based power allocation for sharing the initial power demand between the first and second power sources. Thus, electrical power systems according to the present disclosure can predict, via a power dispatch module, a future power demand due to future load changes using, at least, a plurality of loading data. Accordingly, in an embodiment, the feedforward power dispatch module for multiple power sources (such as a fuel cell assembly and a generator) uses historical data and ambient data to implement load sharing between the power sources. In particular, in an embodiment, the power dispatch module determines first and second power setpoints for the first and second power sources, respectively, based on the future power demand due to the future load changes.

In addition, electrical power systems according to the present disclosure may use passenger number and weather forecast as a predictor to forecast load changes and can dispatch the power demand, e.g., to the fuel cell assembly. The load sharing (e.g., among the fuel cell assembly and generator) may be based on cable impedance (i.e., power loss from fuel cell assembly and the generator to load), electrical conversion efficiency (such as when the engine is idling or is operating at low combustion efficiency scenario), mission profile, abnormal condition for the generator/engine, automatic reconfiguration benefits, etc.

Upon receiving an indication that either of the first power source or the second power source is unable to meet the future power demand, electrical power systems according to the present disclosure can control first and second power outputs of the first and second power sources, respectively, based on the first and second power setpoints to meet respective portions of the future power demand such that the future power demand of the power generation system is shared by the first and second power sources.

Figure 1:
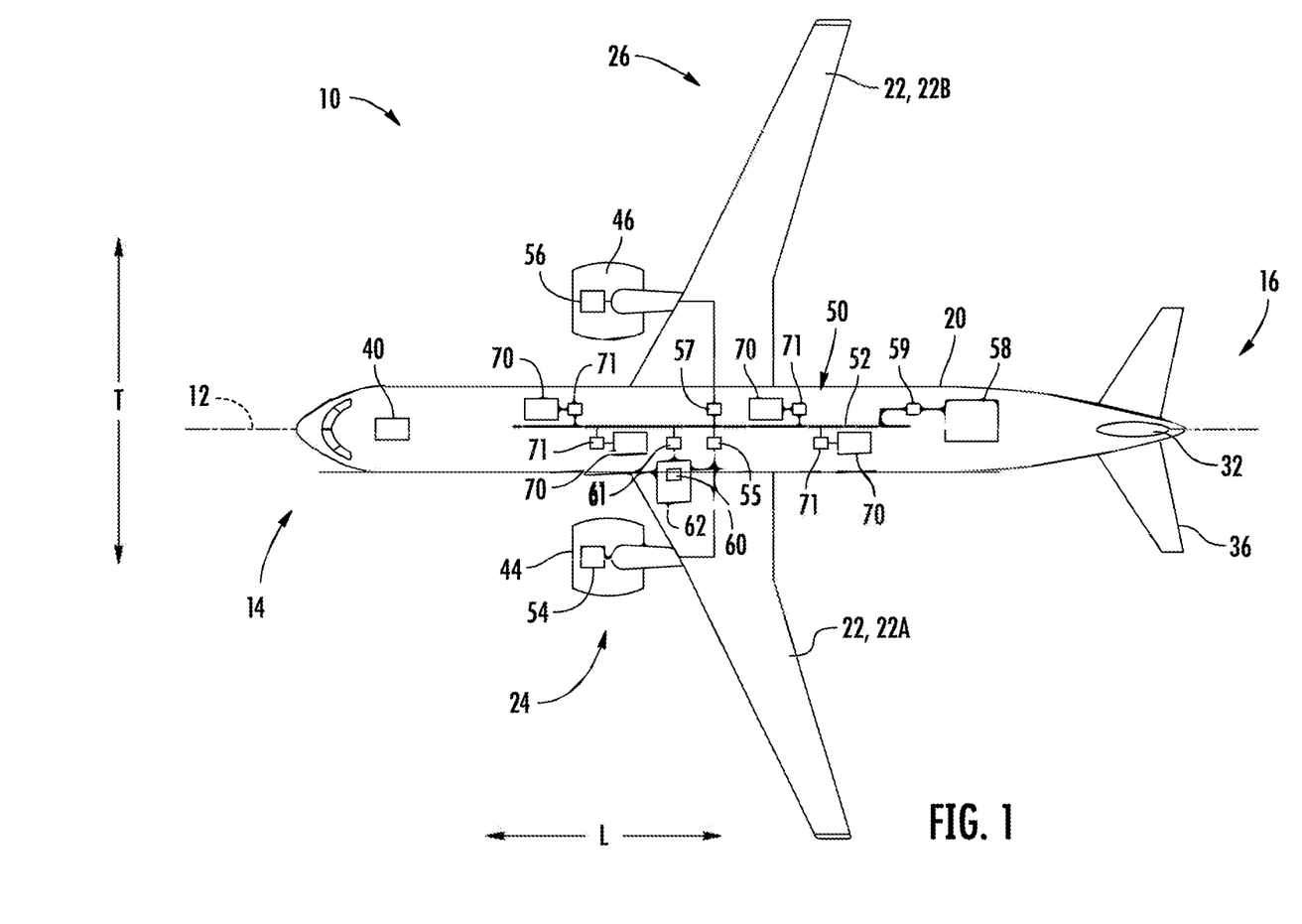
FIG. 1 is a schematic top view of an aircraft in accordance with an example embodiment of the present disclosure.

Referring now to the drawings, wherein identical numerals indicate the same elements throughout the figures, FIG. 1 provides a schematic top view of an aircraft 10 as may incorporate various embodiments of the present disclosure. As shown in FIG. 1, the aircraft 10 defines a longitudinal direction L and a transverse direction T. The aircraft 10 also defines a longitudinal centerline 12 that extends therethrough along the longitudinal direction L. The aircraft 10 extends between a forward end 14 and an aft end 16 along the longitudinal direction L.

In addition, the aircraft 10 includes a fuselage 20 and a pair of wings 22, including a first wing 22A and a second wing 22B. The first wing 22A extends outward from the fuselage 20 generally along the transverse direction T, from a port side 24 of the fuselage 20. The second wing 22B similarly extends outward from the fuselage 20 generally along the transverse direction T from a starboard side 26 of the fuselage 20. The aircraft 10 further includes a vertical stabilizer 32 and a pair of horizontal stabilizers 36. The fuselage 20, wings 22, and stabilizers 32, 36 may together be referred to as a body of the aircraft 10.

The aircraft 10 of FIG. 1 also includes a propulsion system. The propulsion system depicted includes a plurality of aircraft engines, at least one of which is mounted to each of the pair of wings 22A, 22B. Specifically, the plurality of aircraft engines includes a first aircraft engine 44 mounted to the first wing 22A and a second aircraft engine 46 mounted to the second wing 22B. In at least certain embodiments, the aircraft engines 44, 46 may be configured as turbofan engines suspended beneath the wings 22A, 22B in an under-wing configuration. Alternatively, in other example embodiments, the aircraft engines 44, 46 may be mounted in other locations, such as to the fuselage 20 aft of the wings 22. In yet other embodiments, the first and/or second aircraft engines 44, 46 may alternatively be configured as turbojet engines, turboshaft engines, turboprop engines, etc. Further, in other embodiments, the aircraft 10 can have less or more than two aircraft engines. The aircraft 10 can include one or more upper level computing devices 40 communicatively coupled with engine controllers of the first and second aircraft engines 44, 46 so as to command a thrust output of the first and second aircraft engines 44, 46. The upper level computing devices 40 may receive various sensor inputs that may indicate the operating conditions associated with the aircraft 10, such as the flight phase, altitude, attitude, weather conditions, weight of the aircraft 10, etc. The upper level computing devices 40 can be communicatively coupled via a communication network with various processing devices onboard the aircraft 10, such as processors associated with power controllers.

As further shown in FIG. 1, the aircraft 10 includes an electrical power system 50. For this embodiment, the electrical power system 50 includes a power bus 52 to which a plurality of electric power sources and a plurality of electric power consumers are electrically coupled. Particularly, for the depicted embodiment of FIG. 1, the electrical power system 50 includes a first electric machine 54 mechanically coupled with the first aircraft engine 44 (e.g., to a shaft thereof), a second electric machine 56 mechanically coupled with the second aircraft engine 46 (e.g., to a shaft thereof), and an electric energy storage system 58 having one or more batteries, capacitors, etc.

Figure 2:
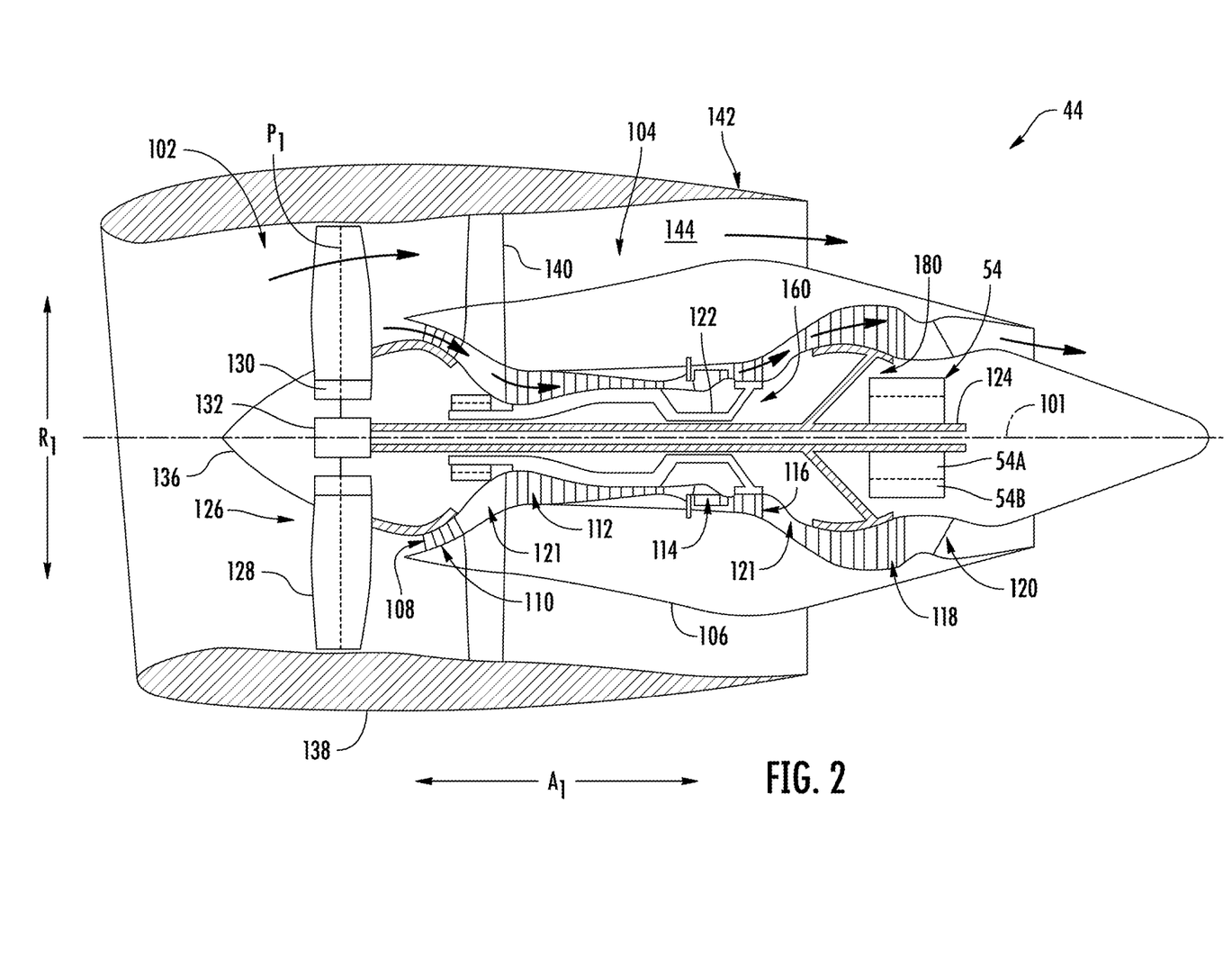
FIG. 2 is a schematic, cross-sectional view of a gas turbine engine of the aircraft of FIG. 1.

FIG. 2 provides a schematic, cross-sectional view of the first aircraft engine 44 and depicts the first electric machine 54 mechanically coupled thereto. As shown in FIG. 2, the first aircraft engine 44 defines an axial direction μl (extending parallel to a longitudinal centerline 101 provided for reference), a radial direction R1, and a circumferential direction (extending about the axial direction μl; not depicted in FIG. 2). The first aircraft engine 44 includes a fan section 102 and a core turbine engine 104 disposed downstream of the fan section 102.

The core turbine engine 104 includes an engine cowl 106 that defines an annular core inlet 108. The engine cowl 106 encases, in a serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, turbine section, and jet exhaust nozzle section 120 together define a core air flowpath 121 extending from the annular core inlet 108 through the LP compressor 110, HP compressor 112, combustion section 114, HP turbine 116, LP turbine 118, and jet exhaust nozzle section 120. A high pressure (HP) shaft 122 drivingly connects the HP turbine 116 to the HP compressor 112. The HP shaft 122 and rotating components of the HP compressor 112 and the HP turbine 116 that are mechanically coupled with the HP shaft 122 collectively form a high pressure spool 160. A low pressure (LP) shaft 124 drivingly connects the LP turbine 118 to the LP compressor 110. The LP shaft 124 and rotating components of the LP compressor 110 and the LP turbine 118 that are mechanically coupled with the LP shaft 124 collectively form a low pressure spool 180.

The fan section 102 may include a fixed or variable pitch fan 126 having a plurality of fan blades 128 coupled to a disk 130 in a spaced apart manner. As depicted, the fan blades 128 extend outward from the disk 130 generally along the radial direction R1. For the variable pitch fan 126 of FIG. 2, each fan blade 128 is rotatable relative to the disk 130 about a pitch axis Px by virtue of the fan blades 128 being mechanically coupled to an actuation member 132 configured to collectively vary the pitch of the fan blades 128 in unison. The fan blades 128, disk 130, and actuation member 132 are together rotatable about the longitudinal centerline 12 by the LP spool 180. As noted above, in some embodiments, the fan blades 128 may be fixed and not rotatable about their respective pitch axes. Further, in other embodiments, the LP spool 180 may be mechanically coupled with the fan 126 via a gearbox.

Referring still to FIG. 2, the disk 130 is covered by a spinner or rotatable front hub 136 aerodynamically contoured to promote an airflow through the plurality of fan blades 128. Additionally, the fan section 102 includes an outer nacelle 138 that circumferentially surrounds the fan 126 and/or at least a portion of the core turbine engine 104. The nacelle 138 is supported relative to the core turbine engine 104 by a plurality of circumferentially-spaced stationary outlet guide vanes 140. A downstream section 142 of the nacelle 138 extends over an outer portion of the core turbine engine 104 so as to define a bypass passage 144 therebetween.

In addition, for this embodiment, the first electric machine 54 is mechanically coupled with the LP spool 180. Particularly, the first electric machine 54 is directly mechanically coupled to the LP shaft 124. In other embodiments, the first electric machine 54 can be indirectly mechanically coupled to the LP shaft 124, e.g., via a gearbox. In yet other embodiments, the first electric machine 54 can be directly or indirectly mechanically coupled to the HP spool 160, such as directly to the HP shaft 122 or indirectly with the HP shaft 122 by way of a gearbox. In further embodiments, where the first aircraft engine 44 has a low pressure spool, an intermediary pressure spool, and a high pressure spool, the first electric machine 54 can be directly or indirectly mechanically coupled to the intermediary spool, such as directly or indirectly to an intermediary shaft of the intermediary spool.

The first electric machine 54 includes a rotor 54A and a stator 54B. The rotor 54A is rotatable with the LP shaft 124. The stator 54B includes electric current-carrying elements, such as windings or coils. In this manner, electrical power can be transmitted to or from the electric current-carrying elements, and as will be appreciated, electrical energy can be converted into mechanical energy in a motoring mode or mechanical energy can be converted into electrical energy in a generating mode as the rotor 54A rotates relative to the stator 54B. The rotor 54A has rotor components for creating a rotor magnetic field in order to couple to the stator magnetic field to enable energy conversion. The rotor components of the rotor 54A can be, without limitation, rotor magnets in case of a permanent magnet synchronous machine, a squirrel cage in case of an induction machine, or a field winding in case of a field wound synchronous machine.

It should also be appreciated that the first aircraft engine 44 depicted in FIG. 2 and the first electric machine 54 mechanically coupled thereto are provided for example purposes and are not intended to be limiting. In other embodiments, the first aircraft engine 44 may have other configurations. For example, in other embodiments, the first aircraft engine 44 may be configured as a turboprop engine, a turbojet engine, a differently configured turbofan engine, or an unducted turbofan engine (e.g., without the nacelle 138, but including the stationary outlet guide vanes 140). For example, the first aircraft engine 44 may be a geared gas turbine engine (e.g., having a reduction gearbox between the LP shaft 124 and fan 126), may have any other suitable number or configuration of shafts/spools (e.g., may include an intermediate speed shaft/turbine/compressor), etc. Furthermore, it will be appreciated that the second electric machine 56 can be configured and mechanically coupled with the second aircraft engine 46 (FIG. 1) in a same or similar manner as the first electric machine 54 is configured and mechanically coupled with the first aircraft engine 44.

Returning particularly to FIG. 1, the first electric machine 54, the second electric machine 56, and the electric energy storage system 58 can each act as electric power sources, or in some instances, as electric power consumers. For example, in some instance, the first electric machine 54 and/or the second electric machine 56 can be electric generators configured to be driven by their respective first and second aircraft engines 44, 46 to generate electric power that can be supplied to one or more electric power consumers. In other instances, the first electric machine 54 and/or the second electric machine 56 can be electric motors configured to drive their respective aircraft engines 44, 46, e.g., in a power assist operation. Accordingly, in such instances, the propulsion system can be a hybrid-electric propulsion system. In some embodiments, the first and/or second electric machines 54, 56 can be combination motor/generators controllable in a generator mode or motor mode. The electric energy storage system 58 can be controlled to either provide electric power to one or more electric power consumers or draw electric power, e.g., for charging. The electrical power system 50 also includes a plurality of electric loads 70 that consume but do not produce electric power, such as an aircraft air conditioning system, avionics computing devices, aircraft control systems, cabin lights, etc.

As further depicted in FIG. 1, the electrical power system 50 also includes a fuel cell assembly 60 that is a component of an environmental control system assembly 62 (or "ECS assembly 62"). The fuel cell assembly 60 can provide electrical power to the plurality of electric loads 70 and/or to the first electric machine 54, the second electric machine 56, and/or to the electric energy storage system 58 depending on their configurations or mode of operation. The ECS assembly 62 is located generally at a juncture between the first wing 22A and the fuselage 20. However, in other exemplary embodiments, the ECS assembly 62 may additionally or alternatively be located at other locations within the aircraft 10, such as at a juncture between the second wing 22B and the fuselage 20, at the aft end 16 of the aircraft 10, etc. In some embodiments, the ECS assembly 62 can include more than one fuel cell assembly, such as two fuel cell assemblies.

Figure 3:
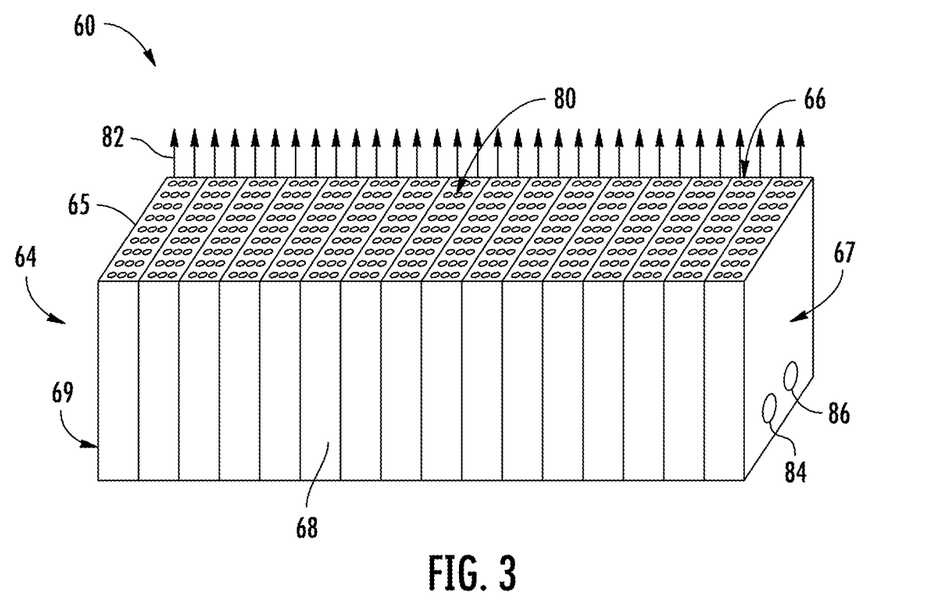
FIG. 3 provides a schematic perspective view of a fuel cell assembly of the aircraft of FIG. 1.

FIG. 3 provides a schematic perspective view of the fuel cell assembly 60 of FIG. 1. In particular, as shown, the fuel cell assembly 60 includes a fuel cell stack 64. The fuel cell stack 64 includes a housing 65 having an outlet side 66 and a side that is opposite to the outlet side 66, a fuel and air inlet side 67 and a side that is opposite to the fuel and air inlet side 67. The fuel cell stack 64 can include a plurality of fuel cells 68 that are "stacked," e.g., side-by-side from one end of the fuel cell stack 64 (e.g., fuel and air inlet side 67) to another end of the fuel cell stack 64 (e.g., side 69). As such, the outlet side 66 includes a plurality of outlets 80, each from a respective fuel cell 68 of the fuel cell stack 64. During operation, output products 82 are directed from the outlets 80 out of the housing 65. In some embodiments, the outlets 80 can include separate fuel outlets (which may be in fluid communication with, e.g., a fuel exhaust line) and air outlets (which may be in fluid communication with e.g., a fuel cell outlet line of a cabin exhaust delivery system). The fuel and air inlet side 67 includes one or more fuel inlets 84 and one or more air inlets 86. Optionally, one or more of the inlets 84, 86 can be on another side of the housing 65. Each of the one or more fuel inlets 84 can be fluidly coupled with, e.g., a fuel delivery line of a fuel delivery system. Each of the one or more air inlets 86 can be fluidly coupled with, e.g., a fuel cell inlet line of an air delivery system.

Figure 4:
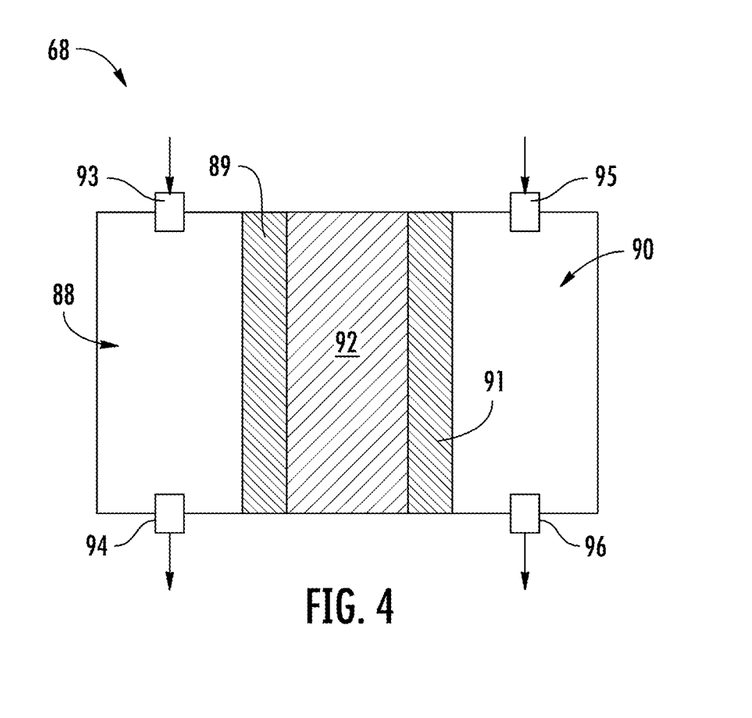
FIG. 4 provides a close-up, schematic view of one fuel cell of the fuel cell assembly of FIG. 3.

FIG. 4 provides a close-up, schematic view of one fuel cell 68 of the fuel cell stack 64 of FIG. 3. The fuel cells 68 of the fuel cell assembly 60 are electro-chemical devices that may convert chemical energy from a fuel into electrical energy through an electro-chemical reaction of the fuel, such as hydrogen, with an oxidizer, such as oxygen contained in the atmospheric air. Accordingly, the fuel cell assembly 60 can advantageously be utilized as a power source. The example fuel cell 68 depicted in FIG. 4, and each of the fuel cells 68 of the fuel cell stack 64 of FIG. 3, are configured as proton exchange membrane fuel cells ("PEM fuel cells"), also known as a polymer electrolyte membrane fuel cell. PEM fuel cells have an operating temperature range and operating temperature pressure determined to work well with the conditions associated with aircraft and other vehicles.

As depicted schematically in FIG. 4, the fuel cell 68 includes a cathode side 88, an anode side 90, and an electrolyte layer 92 positioned between the cathode side 88 and the anode side 90. The cathode side 88 can include a cathode 89 and the anode side 90 can include an anode 91. Further, the cathode side 88 includes a cathode inlet 93 and a cathode outlet 94 and the anode side 90 includes an anode inlet 95 and an anode outlet 96. The cathode side 88 of the fuel cell 68, and more specifically, the cathode inlet 93 of the cathode side 88, can be in fluid communication with, e.g., a cabin exhaust delivery system, and more specifically, a fuel cell inlet line of the cabin exhaust delivery system. The cathode outlet 94 is in fluid communication with a fuel cell outlet line of the cabin exhaust delivery system. Similarly, the anode side 90 of the fuel cell 68, and more specifically, the anode inlet 95 of the anode side 90, is in fluid communication with, e.g., a fuel delivery line of a fuel delivery system. The anode outlet 96 is in fluid communication with e.g., a fuel exhaust line of the fuel delivery system. Accordingly, air may pass through the cathode side 88 and fuel may pass through the anode side 90.

Returning to FIG. 1, the electrical power system 50 may further include a plurality of power controllers 55, 57, 59, 61, 71. Each power controller 55, 57, 59, 61, 71 can include one or more processors and one or more non-transitory memory devices, e.g., embodied in a controller, and power electronics to convert electrical power, e.g., from alternating current (AC) to direct current (DC) or vice versa, or to condition the electrical power to a desired voltage, current, or both. As depicted in FIG. 1, the first electric machine 54 has an associated power controller 55 that controls the electric power between the first electric machine 54 and the power bus 52. Likewise, the second electric machine 56 has an associated power controller 57 that controls the electric power between the second electric machine 56 and the power bus 52. The electric energy storage system 58 also has an associated power controller 59 that controls the electric power between the electric energy storage system 58 and the power bus 52. In addition, the fuel cell assembly 60 has an associated power controller 61 that controls the electric power between the fuel cell assembly 60 and the power bus 52. Similarly, power controllers 71 can be arranged to control the electric power provided from the power bus 52 to the power consuming one or more electric loads 70.

For this embodiment, the electrical power system 50 is configured as a decentralized power allocation system. That is, the architecture of the electrical power system 50 enables the power controllers to control the electrical power outputs of their respective power sources to meet the power demands of the power consumers collaboratively, adaptively, and without active supervision, e.g., from a supervisor controller. Decentralized control of electric power transmission from power sources to one or more power consumers can provide certain advantages, benefits, and technical effects. For instance, the decentralized electrical power allocation systems provided herein may address the drawbacks of conventional centralized power allocation systems and offer collaborative and adaptive control of the power outputs of the power sources to meet a power demand on a power bus applied by the one or more power consumers. In this regard, less computing resources and communication networks may be needed (which has the added benefit of reducing the weight of a vehicle), and localized control can be achieved whilst still being collaborative with other power sources and adaptive to meet to the power demand on the power bus.

Figure 5:
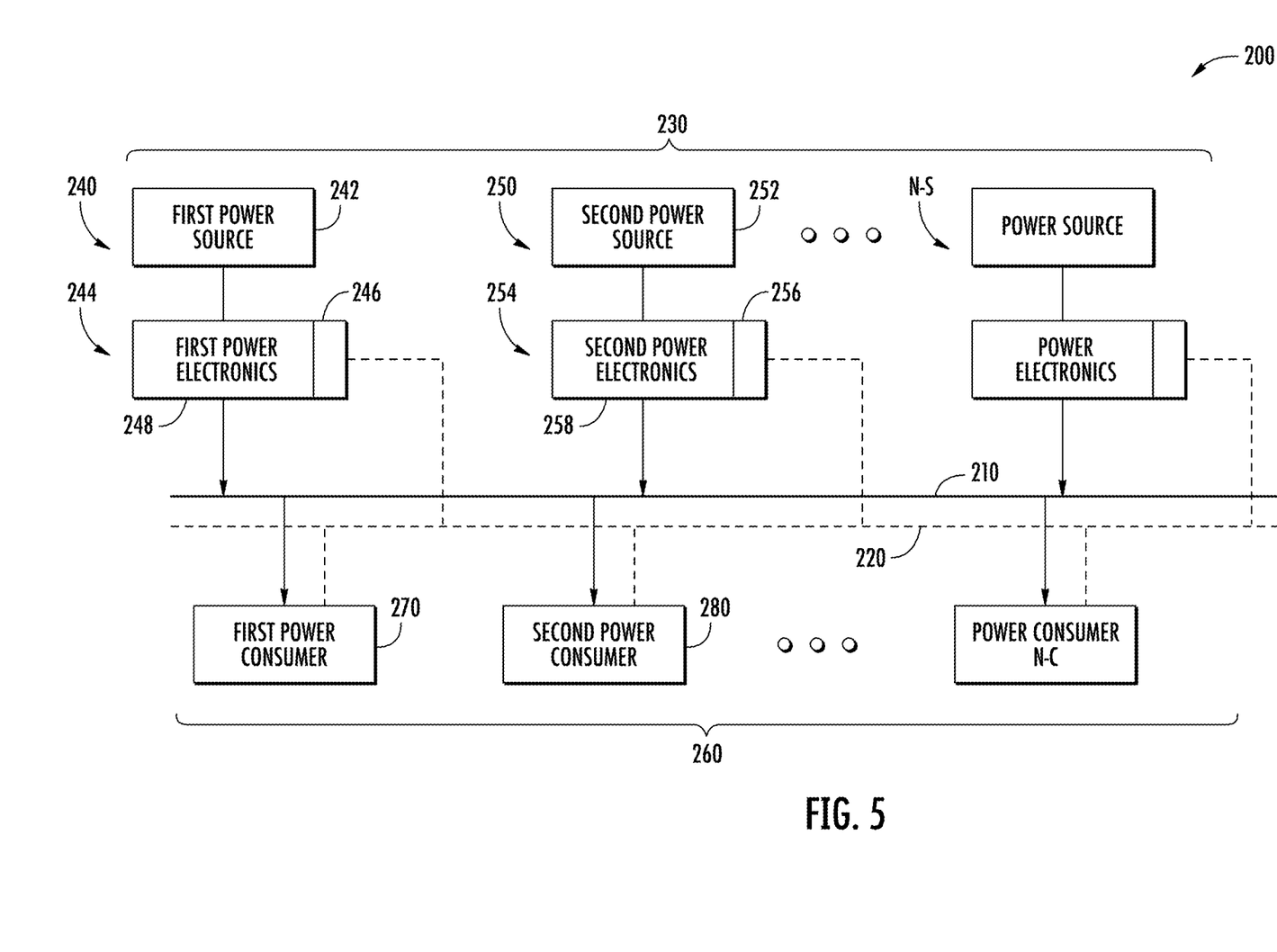
FIG. 5 provides a system diagram of an electrical power system according to an example embodiment of the present disclosure, the electrical power system having a direct current power bus.

FIG. 5 provides a system diagram of an electrical power system 200 according to an example embodiment of the present disclosure. The electrical power system 200 is configured as a decentralized power allocation system in FIG. 5. The electrical power system 200 can be implemented in a vehicle, such as the aircraft 10 of FIG. 1, ships, trains, unmanned aerial vehicles, automobiles, etc.

As depicted in FIG. 5, the electrical power system 200 includes a direct current power bus (or DC power bus 210), a plurality of power source assemblies 230 electrically coupled with the DC power bus 210, and one or more electric power consumers 260 electrically coupled with the DC power bus 210. The electrical power system 200 further includes a communication bus 220 (shown in dashed lines in FIG. 5), which may include one or more wired or wireless communication links. The communication bus 220 enables communication between various components of the electrical power system 200.

For this embodiment, the plurality of power source assemblies 230 include a first power source assembly 240 and a second power source assembly 250. Each power source assembly includes an electric power source and a power controller. For instance, the first power source assembly 240 has a first power source 242 and a first power controller 244. The second power source assembly 250 has a second power source 252 and a second power controller 254. In an embodiment, for example, the first power source 242 is an electric machine configured as an electric generator or operable in a generator mode and the second power source 252 is a fuel cell assembly. As represented in FIG. 5, the plurality of power source assemblies 230 can include more than two (2) power source assemblies in other example embodiments, or N-S number of power source assemblies, wherein N-S is an integer equal to or greater than two (2).

The first power source 242 and the second power source 252 are electrically coupled with the DC power bus 210. The first power controller 244 controls electric power provided from the first power source 242 to the DC power bus 210. Similarly, the second power controller 254 controls electric power provided from the second power source 252 to the DC power bus 210. The first power controller 244 and the second power controller 254 each include one or more processors and one or more non-transitory memory devices embodied in a first controller 246 and a second controller 256, respectively. The first power controller 244 includes first power electronics 248 to convert or condition electrical power provided from the first power source 242 to the DC power bus 210. The first power electronics 248 can include a plurality of switches controllable in a switching scheme, for example. Similarly, the second power controller 254 includes second power electronics 258 to convert or condition electrical power provided from the second power source 252 to the DC power bus 210. The second power electronics 258 can include a plurality of switches controllable in a switching scheme, for example. The first controller 246 and the second controller 256 are communicatively coupled with one another (and to other components) via the communication bus 220.

The one or more electric power consumers 260 include a first power consumer 270 and a second power consumer 280 in this example embodiment. In some embodiments, the first power consumer 270 can represent one or more mission critical or essential loads and the second power consumer 280 can represent one or more non-essential loads. The one or more electric power consumers 260, or sensors or communication interfaces thereof, can be communicatively coupled with the first controller 246 and the second controller 256 of the first and second power source assemblies 240, 250 via the communication bus 220. As represented in FIG. 5, the one or more electric power consumers 260 can include one or more power consumers, or N—C number of power consumer assemblies, wherein N—C is an integer equal to or greater than one (1).

In addition, for the depicted embodiment of FIG. 5, the first power consumer 270 and the second power consumer 280 are both directly electrically coupled with the DC power bus 210. However, in other embodiments, the first power consumer 270 and/or the second power consumer 280 can be indirectly electrically coupled with the DC power bus 210. For example, an intermediate power bus and/or other power electronics can be positioned electrically between the DC power bus 210 and the first power consumer 270 and/or the second power consumer 280.

Figure 6:
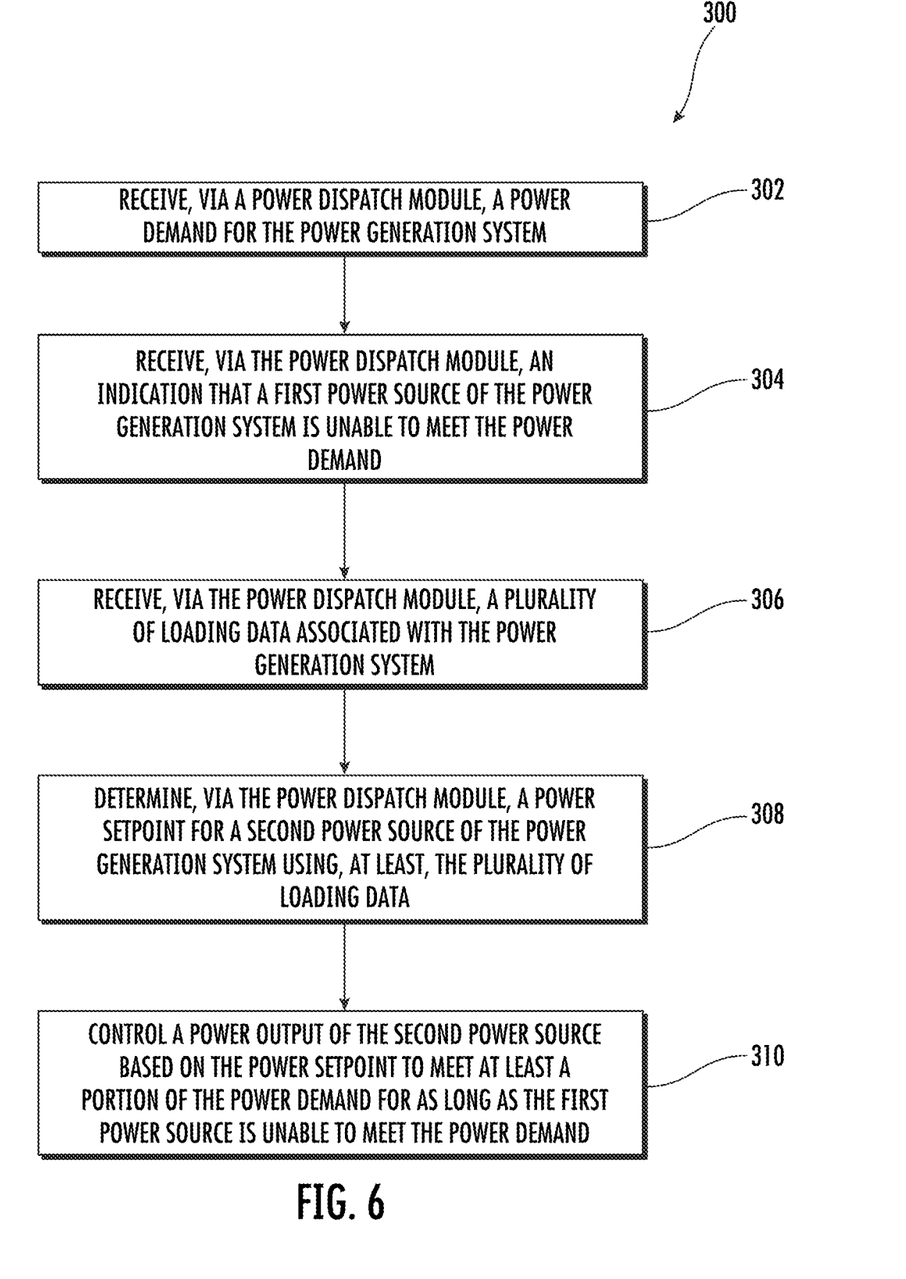
FIG. 6 provides a flow diagram of an embodiment of a method of operating a power generation system for an aircraft according to the present disclosure.
Figure 7:
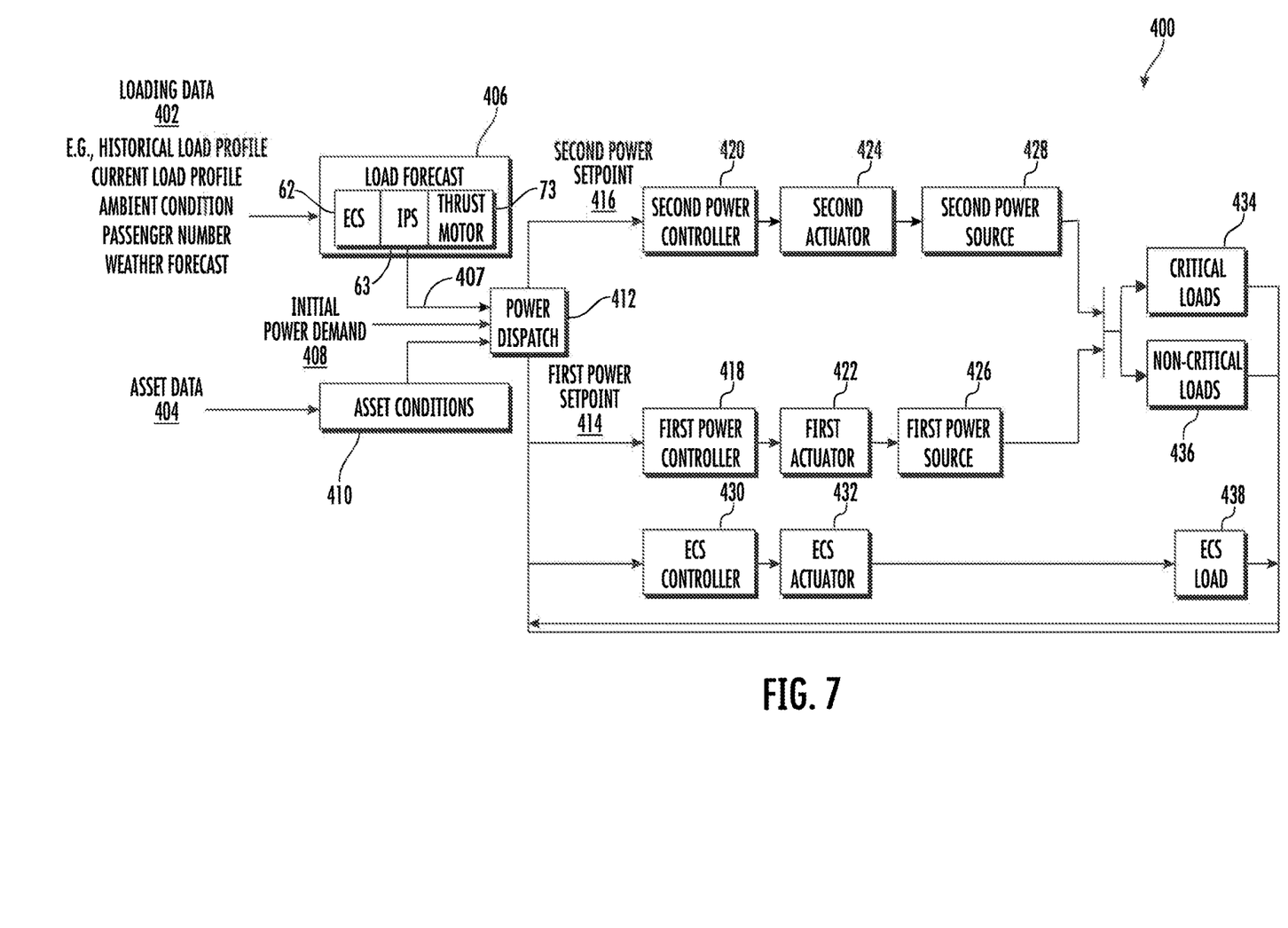
FIG. 7 provides a logic flow diagram of an embodiment of an algorithm for operating a power generation system for an aircraft according to the present disclosure.

Referring now to FIGS. 6 and 7, methods of operating a power generation system for an aircraft, such as the electrical power system 200 of FIG. 5, are illustrated according to the present disclosure. In particular, FIG. 6 provides a flow chart of an embodiment of a method 300 of operating a power generation system for an aircraft according to the present disclosure, whereas FIG. 7 provides a logic flow diagram of an algorithm 400 for operating a power generation system for an aircraft according to the present disclosure. FIG. 6 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

As shown at 302 of FIG. 6, the method 300 includes receiving, via a power dispatch module, a power demand for the power generation system. As shown at 304, the method 300 includes receiving, via the power dispatch module, an indication that a first power source of the power generation system is unable to meet the power demand. As shown at 306, the method 300 includes receiving, via the power dispatch module, a plurality of loading data associated with the power generation system. As shown at 308, the method 300 includes determining, via the power dispatch module, a power setpoint for a second power source of the power generation system using, at least, the plurality of loading data. As shown at 310, the method 300 includes controlling a power output of the second power source based on the power setpoint to meet at least a portion of the power demand for as long as the first power source is unable to meet the power demand.

The method 300 of FIG. 6 can be better understood with reference to FIG. 7. In particular, as shown at 402, the algorithm 400 includes receiving a plurality of loading data associated with the power generation system. In particular, as shown, the plurality of loading data may generally include historical loading data, current loading data, ambient data (e.g., atmospheric data), passenger data of the aircraft (e.g., a number of passengers and/or a weight of the passengers), weather forecast data, and/or electrical consumption data as a function of flight stage, altitude, or weather condition. Thus, as shown at 406, the algorithm 400 includes predicting a future power demand 407 based on one or more future load changes as determined from the plurality of loading data. In particular embodiments, as shown, the algorithm 400 may predict the future power demand 407 as required by the ECS assembly 62 (FIG. 7), an ice protection system 63 (FIG. 7), a thrust motor system 73 (FIG. 7), or any other system of the aircraft 10.

In addition, as shown, the algorithm 400 includes receiving asset data 404 associated with the power generation system. In such embodiments, the asset data 404 may include, for example, a cable impedance of the first power source 426 and/or the second power source 428, an electrical conversion efficiency of the first power source 426 and/or the second power source 428, a mission profile of the aircraft 10 of FIG. 1, one or more abnormal conditions of the first power source 423 and/or the second power source 428, health data relating to the first power source 426 and/or the second power source 428, and/or automatic reconfiguration benefits of the first power source 426 and/or the second power source 428. The asset data 404 may further include power characteristics which generally refers to the power output forecast as a function of flight stage, altitude, or weather condition. For example, in an embodiment, given the same fuel input command, the engine-driven generator may generate different power outputs depending on the altitude and/or flight speed. The asset data 404 may further include efficiency characteristics which generally refers to the power output forecast as a function of flight stage, altitude, or weather condition. For example, in an embodiment, given the same fuel input command, the engine-driven generator may have lower electrical conversion efficiency, such as when engine is at idling compared to cruise. Thus, as shown at 410, the algorithm 400 can determine various asset conditions based on the received asset data 404.

Moreover, as shown, the algorithm 400 includes receiving an initial power demand 408 for the power generation system. Thus, in an embodiment, the algorithm 400 uses droop-based power allocation as a baseline for sharing the initial power demand 408 among the first and second power sources 426, 428.

Figure 8:
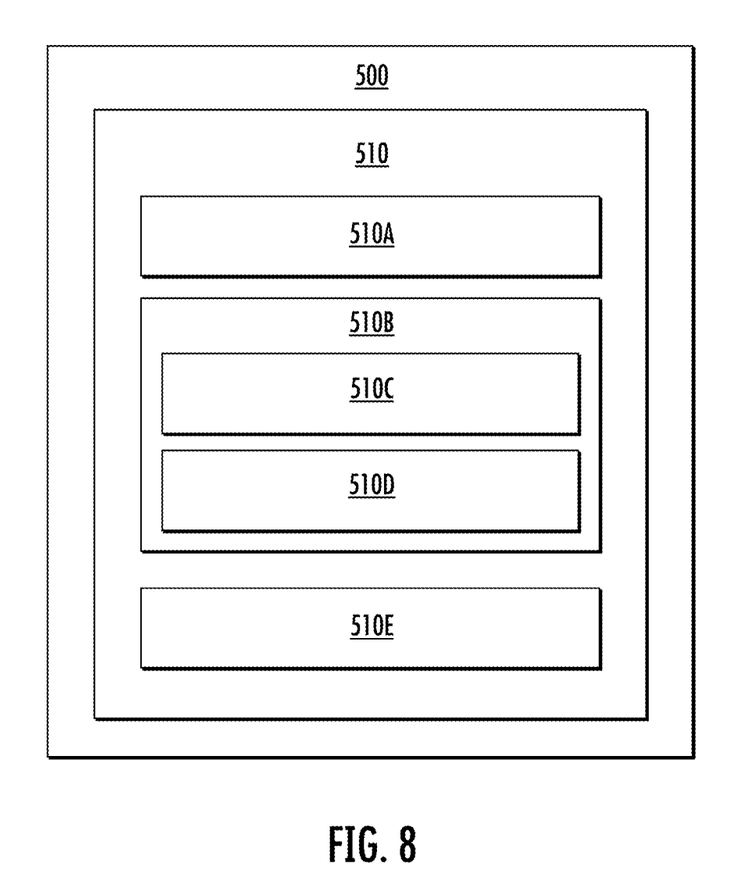
FIG. 8 provides a computing system according to example embodiments of the present disclosure.

Accordingly, as shown, the algorithm 400 further includes a power dispatch module 412, which may be a controller that includes one or more processors (similar to the controller 500 of FIG. 8). Thus, in an embodiment, the power dispatch module 412 is configured to determine one or more setpoints using the loading data 402 and/or the asset data 404 such that the various power sources 426, 428 of the power generation system can share the load required by the future power demand 407 as needed. In particular embodiments, as shown, the power dispatch module 412 is configured to generate a first power setpoint 414 for a first power source 426 (which may be the same as the first power source 242) and a second power setpoint 416 for the second power source 428 (which may be the same as second power source 252) using the loading data 402 and/or the asset data 404. As mentioned, in an embodiment, the first power source 426 is an electric machine configured as an electric generator or operable in a generator mode and the second power source 428 is a fuel cell assembly or any suitable standalone power source, such as a battery, an auxiliary power unit (APU), or an engine-driven generator. In further embodiments, the standalone power source may be sized for a power rating of about 30% more than the power demand.

Still referring to FIG. 7, for example, the first and second power setpoints 416, 418 may be received by respective first and second power controllers 418, 420 of the power generation system. Thus, as shown, in an embodiment, the first and second power controllers 418, 420 are configured to manipulate first and second actuators 422, 424 of the first and second power sources 426, 428, respectively, so as to provide first and second power outputs of the first and second power sources 426, 428 that meet the power demand 408.

Moreover, as shown, the first and second power sources 426, 428 are configured to generate a power output according to their respective first and second power setpoints 414, 416 so as to supply power to critical loads 434, non-critical loads 436, and/or an ECS load 438. In particular embodiments, the ECS load 438 may be determined and regulated using, for example, an ECS controller 430 and/or an ECS actuator 432. As used herein, the critical loads 434 may generally refer to electric motor driven propulsion, an electric-based Ice Protection System (IPS), etc., whereas non-critical loads 436 may generally refer to the electricity load for lighting, kitchen, air conditioning, etc. As such, the algorithm 400 can be particularly useful in the event that the first or second power sources 426, 428 are unable to meet the power demand 408.

In particular embodiments, as an example, the algorithm 400 may be applied when one of the first or second power sources 426, 428 is unable to meet the power demand 408. For example, in such embodiments, the algorithm 400 may receive an initial power demand for the power generation system and use droop-based power allocation as a baseline for sharing the initial power demand among the first and second power sources 426, 428. More particularly, in an embodiment, the algorithm 400 is configured to predict the future power demand 407 due to future load changes using, at least, the plurality of loading data described herein. Thus, in an embodiment, where the first power source 426 is a generator and the algorithm 400 receives an indication that the generator is unable to meet the future power demand 407, the power dispatch module 412 is configured to determine a power setpoint for the fuel cell assembly (e.g., the second power source 428) (that can accommodate the additional load).

Accordingly, in such embodiments, the algorithm 400 further includes controlling a power output of the fuel cell assembly (e.g., the second power source 428) based on the power setpoint to meet at least a portion of the future power demand 407 for as long as the generator is unable to meet the future power demand 407.

FIG. 8 provides a controller 500 according to example embodiments of the present disclosure. The computing devices or elements described herein, such as the controllers 246, 256 (FIG. 5), may include various components and perform various functions of the controller 500 provided below.

The controller 500 can include one or more computing devices 510. The computing device(s) 510 can include one or more processors 510A and one or more memory devices 510B. The processor(s) 510A can include any suitable processing device, such as a microprocessor, microcontroller, integrated circuit, logic device, and/or other suitable processing device. The memory device(s) 510B can include one or more computer-executable or computer-readable media, including, but not limited to, non-transitory computer-readable medium, RAM, ROM, hard drives, flash drives, and/or other memory devices.

The memory device(s) 510B can store information accessible by the processor(s) 510A, including computer-readable instructions 510C that can be executed by the processor(s) 510A. The instructions 510C can be any set of instructions that, when executed by the processor(s) 510A, cause the processor(s) 510A to perform operations, such executing adaptive droop control schemes. The instructions 510C can be software written in any suitable programming language or can be implemented in hardware. Additionally, and/or alternatively, the instructions 510C can be executed in logically and/or virtually separate threads on processor(s) 510A. The memory device(s) 510B can further store data 510D that can be accessed by the processor(s) 510A. For example, the data 510D can include models, lookup tables, databases, etc., and particularly, sets of droop control functions.

The computing device(s) 510 can also include a network interface 510E used to communicate, for example, with the other components of the controller 500 (e.g., via a communication network). The network interface 510E can include any suitable components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A method of operating a power generation system for an aircraft, comprising: receiving, via a power dispatch module, a power demand for the power generation system; receiving, via the power dispatch module, an indication that a first power source of the power generation system is unable to meet the power demand; receiving, via the power dispatch module, a plurality of loading data associated with the power generation system; determining, via the power dispatch module, a power setpoint for a second power source of the power generation system using, at least, the plurality of loading data; and controlling a power output of the second power source based on the power setpoint to meet at least a portion of the power demand for as long as the first power source is unable to meet the power demand.

The method of any preceding clause, wherein the plurality of loading data comprises at least one of historical loading data, current loading data, ambient data, passenger data of the aircraft, or weather forecast data.

The method of any preceding clause, wherein determining the power setpoint for the second power source of the power generation system using, at least, the plurality of loading data further comprises: determining the power setpoint for the second power source of the power generation system using the plurality of loading data and asset data.

The method of any preceding clause, wherein the asset data comprises at least one of a cable impedance of at least one of the first power source and the second power source, an electrical conversion efficiency of the first power source and the second power source, a mission profile of the aircraft, one or more abnormal conditions of the first power source and the second power source, health data relating to at least one of the first power source and the second power source, and automatic reconfiguration benefits of the first power source and the second power source.

The method of any preceding clause, further comprising using droop-based power allocation as a baseline for sharing the power demand before receiving the indication that the first power source of the power generation system is unable to meet the power demand.

The method of any preceding clause, wherein the first power source is one of an electric machine mechanically coupled with a gas turbine engine or a fuel cell assembly and the second power source is a standalone power source.

The method of any preceding clause, wherein the standalone power source comprises one of another fuel cell assembly, a battery, an auxiliary power unit (APU), or an engine-driven generator.

The method of any preceding clause, wherein the standalone power source is sized for a power rating of about 30% more than the power demand.

A method of operating a power generation system for an aircraft, comprising: receiving an initial power demand for the power generation system; using droop-based power allocation for sharing the initial power demand between a first power source and a second power source of the power generation system; predicting, via a power dispatch module, a future power demand due to future load changes using, at least, a plurality of loading data; determining, via the power dispatch module, first and second power setpoints for the first and second power sources, respectively, based on the future power demand due to the future load changes; and upon receiving an indication that either of the first power source or the second power source is unable to meet the future power demand, controlling first and second power outputs of the first and second power sources, respectively, based on the first and second power setpoints to meet respective portions of the future power demand such that the future power demand of the power generation system is shared by the first and second power sources.

The method of any preceding clause, wherein the plurality of loading data comprises at least one of historical loading data, current loading data, ambient data, passenger data of the aircraft, or weather forecast data.

The method of any preceding clause, wherein predicting the future power demand due to the future load changes using, at least, the plurality of loading data further comprises: predicting the future power demand due to the future load changes using the plurality of loading data and asset data.

The method of any preceding clause, wherein the asset data comprises at least one of a cable impedance of at least one of the first power source and the second power source, an electrical conversion efficiency of the first power source and the second power source, a mission profile of the aircraft, one or more abnormal conditions of the first power source and the second power source, health data relating to at least one of the first power source and the second power source, and automatic reconfiguration benefits of the first power source and the second power source.

The method of any preceding clause, wherein the first power source is an electric machine mechanically coupled with a gas turbine engine and the second power source is a fuel cell assembly.

The method of any preceding clause, wherein the fuel cell assembly is sized for a power rating of about 30% more than the power demand.

A power generation system for an aircraft, the power generation system comprising: a first power source; a second power source; and a power dispatch module communicatively coupled with the first and second power sources, the power dispatch module comprising a controller having one or more processors configured to perform a plurality of operations, the plurality of operations comprising: receiving a plurality of loading data associated with the power generation system; predicting a future power demand due to future load changes using, at least, the plurality of loading data; determining first and second power setpoints for the first and second power sources, respectively, based on the future power demand due to the future load changes; and controlling first and second power outputs of the first and second power sources based on the first and second power setpoints such that the future power demand of the power generation system is shared by the first and second power sources.

The power generation system of any preceding clause, wherein the plurality of loading data comprises at least one of historical loading data, current loading data, ambient data, passenger data of the aircraft, or weather forecast data.

The power generation system of any preceding clause, wherein predicting the future power demand due to the future load changes using, at least, the plurality of loading data further comprises: predicting the future power demand due to the future load changes using the plurality of loading data and asset data.

The power generation system of any preceding clause, wherein the asset data comprises at least one of a cable impedance of at least one of the first power source and the second power source, an electrical conversion efficiency of the first power source and the second power source, a mission profile of the aircraft, one or more abnormal conditions of the first power source and the second power source, health data relating to at least one of the first power source and the second power source, and automatic reconfiguration benefits of the first power source and the second power source.

The power generation system of any preceding clause, further comprising: receiving an initial power demand for the power generation system; and using droop-based power allocation as a baseline for sharing the initial power demand among the first and second power sources.

The power generation system of any preceding clause, wherein the first power source is an electric machine mechanically coupled with a gas turbine engine and the second power source is a fuel cell assembly.

We claim:

1. A method of operating a power generation system for an aircraft, comprising:
    receiving, via a power dispatch module, a power demand for the power generation system;
    receiving, via the power dispatch module, an indication that a first power source of the power generation system is unable to meet the power demand;
    receiving, via the power dispatch module, a plurality of loading data associated with the power generation system;
    determining, via the power dispatch module, a first power setpoint for the first power source of the power generation system using, at least, the plurality of loading data;
    determining, via the power dispatch module, a second power setpoint for a second power source of the power generation system using, at least, the plurality of loading data; and
    controlling first and second power outputs of the first and second power sources via a first actuator and a second actuator of the first and second power sources based on the first and second power setpoints such that the future power demand of the power generation system is shared by the first and second power sources.

2. The method of claim 1, wherein the plurality of loading data comprises at least one of historical loading data, current loading data, ambient data, passenger data of the aircraft, or weather forecast data.

3. The method of claim 1, wherein determining the second power setpoint for the second power source of the power generation system using, at least, the plurality of loading data further comprises:
    determining the second power setpoint for the second power source of the power generation system using the plurality of loading data and asset data.

4. The method of claim 3, wherein the asset data comprises at least one of a cable impedance of at least one of the first power source and the second power source, an electrical conversion efficiency of the first power source and the second power source, a mission profile of the aircraft, one or more abnormal conditions of the first power source and the second power source, health data relating to at least one of the first power source and the second power source, and automatic reconfiguration benefits of the first power source and the second power source.

5. The method of claim 1, further comprising using droop-based power allocation as a baseline for sharing the power demand before receiving the indication that the first power source of the power generation system is unable to meet the power demand.

6. The method of claim 1, wherein the first power source is one of an electric machine mechanically coupled with a gas turbine engine or a fuel cell assembly and the second power source is a standalone power source.

7. The method of claim 6, wherein the standalone power source comprises one of another fuel cell assembly, a battery, an auxiliary power unit (APU), or an engine-driven generator.

8. The method of claim 6, wherein the standalone power source is sized for a power rating of about 30% more than the power demand.

9. A method of operating a power generation system for an aircraft, comprising:
receiving an initial power demand for the power generation system;
using droop-based power allocation for sharing the initial power demand between a first power source and a second power source of the power generation system;
predicting, via a power dispatch module, a future power demand due to future load changes using, at least, a plurality of loading data;
determining, via the power dispatch module, first and second power setpoints for the first and second power sources, respectively, based on the future power demand due to the future load changes; and
upon receiving an indication that either of the first power source or the second power source is unable to meet the future power demand, controlling a first power output of the first power source via a first actuator of the first power source and a second power output of the second power source via a second actuator of the second power source, based on the first and second power setpoints to meet respective portions of the future power demand such that the future power demand of the power generation system is shared by the first and second power sources.

10. The method of claim 9, wherein the plurality of loading data comprises at least one of historical loading data, current loading data, ambient data, passenger data of the aircraft, or weather forecast data.

11. The method of claim 9, wherein predicting the future power demand due to the future load changes using, at least, the plurality of loading data further comprises:
predicting the future power demand due to the future load changes using the plurality of loading data and asset data.

12. The method of claim 11, wherein the asset data comprises at least one of a cable impedance of at least one of the first power source and the second power source, an electrical conversion efficiency of the first power source and the second power source, a mission profile of the aircraft, one or more abnormal conditions of the first power source and the second power source, health data relating to at least one of the first power source and the second power source, and automatic reconfiguration benefits of the first power source and the second power source.

13. The method of claim 9, wherein the first power source is an electric machine mechanically coupled with a gas turbine engine and the second power source is a fuel cell assembly.

14. The method of claim 13, wherein the fuel cell assembly is sized for a power rating of about 30% more than the initial power demand.

15. A power generation system for an aircraft, the power generation system comprising:
a first power source having a first actuator;
a second power source having a second actuator; and
a power dispatch module communicatively coupled with the first and second power sources, the power dispatch module comprising a controller having one or more processors configured to perform a plurality of operations, the plurality of operations comprising:
receiving a plurality of loading data associated with the power generation system;
predicting a future power demand due to future load changes using, at least, the plurality of loading data;
determining first and second power setpoints for the first and second power sources, respectively, based on the future power demand due to the future load changes; and
controlling first and second power outputs of the first and second power sources via the first actuator and the second actuator of the first and second power sources based on the first and second power setpoints such that the future power demand of the power generation system is shared by the first and second power sources.

16. The power generation system of claim 15, wherein the plurality of loading data comprises at least one of historical loading data, current loading data, ambient data, passenger data of the aircraft, or weather forecast data.

17. The power generation system of claim 15, wherein predicting the future power demand due to the future load changes using, at least, the plurality of loading data further comprises:
predicting the future power demand due to the future load changes using the plurality of loading data and asset data.

18. The power generation system of claim 17, wherein the asset data comprises at least one of a cable impedance of at least one of the first power source and the second power source, an electrical conversion efficiency of the first power source and the second power source, a mission profile of the aircraft, one or more abnormal conditions of the first power source and the second power source, health data relating to at least one of the first power source and the second power source, and automatic reconfiguration benefits of the first power source and the second power source.

19. The power generation system of claim 15, further comprising:
receiving an initial power demand for the power generation system; and using droop-based power allocation as a baseline for sharing the initial power demand among the first and second power sources.

20. The power generation system of claim 15, wherein the first power source is an electric machine mechanically coupled with a gas turbine engine and the second power source is a fuel cell assembly.

* * * * *